Oct. 24, 1933.                G. W. CHORMANN                1,931,718
                               FLUTED RUB BRICK
                             Filed Sept. 16, 1929

INVENTOR
George W. Chormann
BY Thomas C. MacKay
ATTORNEY

Patented Oct. 24, 1933

1,931,718

UNITED STATES PATENT OFFICE 1,931,718

FLUTED RUB BRICK

George W. Chormann, Niagara Falls, N. Y., assignor to The Carborundum Company, Niagara Falls, N. Y., a corporation of Pennsylvania Application September 16, 1929
Serial No. 393,097

1 Claim. (Cl. 51—205)

My improvement relates to manual means for rubbing down concrete surfaces, walls, and other objects which have form marks and other undesirable irregularities on their surfaces, which irregularities can only be removed within a reasonable time by the use of hard abrading material. The particular object of my improvement is to provide a light fluted brick of bonded silicon carbide or other hard abrasive constructed in such a manner that it will rapidly remove excess material, wear evenly, and will not readily clog with the abraded material.

It has long been the custom to use scouring bricks of very hard material. The weight of such bricks, the slowness of their action, and the rapidity with which they usually clog, as well as the inconvenient means for manual support, have been some of the disadvantages in their use.

The means which I have used to overcome these disadvantages are illustrated by means of the accompanying drawing in which.

Figure 1:
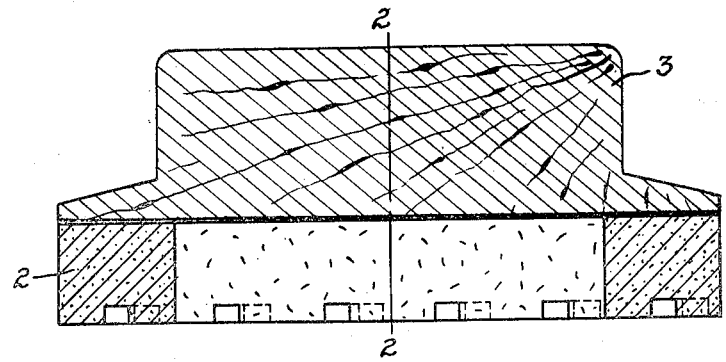
Figure 1 is a longitudinal section of the brick and a wooden handle in a plane at right angles to the abrasive surface.
Figure 2:
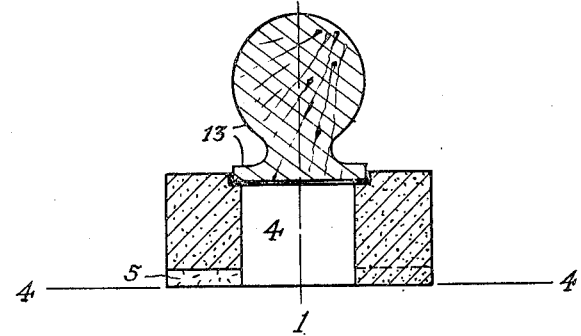
Figure 2 is a section on the line 2—2 of Fig. 1.
Figure 3:
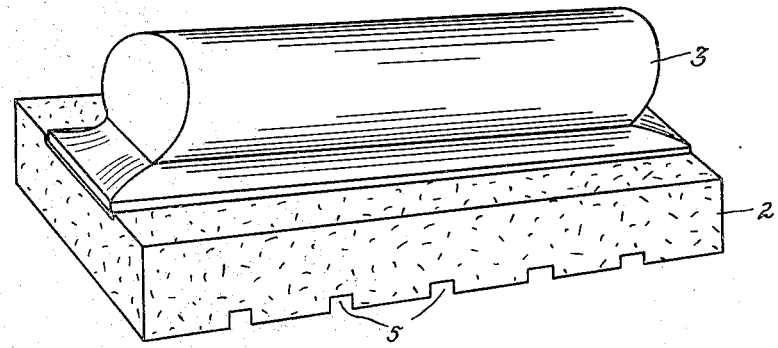
Figure 3 is a perspective view of the brick and handle.

Referring to the drawing more particularly, an abrasive brick 2 is provided with a handle 3. The central portion of the brick is hollowed out as at 4. The base is provided with grooves 5 which extend diagonally to the length of the brick.

My bricks may be made from silicon carbide grains bonded with clay mixtures or other silica bearing materials which will vitrify at high temperatures, thus forming a strongly bonded article. The wooden handle shown in Fig. 1 may be attached to the brick by means of shellac or other cement which will remain hard at the temperature at which the brick is usually employed. Phenol condensation product resins make fairly satisfactory cements. By using a solvent such as furfural the cement may be anchored in the brick and in the wooden handle since the dissolved resin will penetrate the pores of the abrasive and wood. The cement may be hardened by heating the article at a temperature of about 160° C. for several hours.

It is obvious that my design of brick gives a light abrasive article which can be moved about with ease. Moreover, the grooves 5 and the cavity 4 permit the accumulation of abraded material which would otherwise clog the brick.

I do not wish to restrict myself to the use of silicon carbide as the abrasive material. I may use fused alumina or other hard material which may be molded into the shape which I have described.

I claim:

A scouring article comprising in combination a brick composed of bonded silicon carbide having a relatively large hollow center and a plurality of grooves in its base extending from the hollow center to the sides of the brick in a direction diagonal to its length, and a handle for said brick which covers the hollow center and is cemented in a slot in the upper surface of the brick, said handle having large end surfaces shaped to facilitate pushing operations in the direction of the longitudinal axis of the brick and said handle having longitudinal recesses parallel to the long axis of the brick for receiving the operator's fingers and facilitating lateral scouring movements.

GEORGE W. CHORMANN.